United States Patent
McMahon et al.

(10) Patent No.: US 10,812,267 B2
(45) Date of Patent: Oct. 20, 2020

(54) SECURE PASSWORD LOCK AND RECOVERY

(71) Applicant: International Business Machines Corporation, Armonk, NY (US)

(72) Inventors: Simon McMahon, GoldCoast (AU); Narayana Madineni, Southport (AU); Michael W. Gray, Runaway Bay (AU); Leigh McLean, Nerang (AU); Matthew Green, Canberra (AU); Luvita Burgess, Mount Gravatt East (AU); Stephen J. McKenzie, Mudgeeraba (AU); Peter Waltenberg, Robina (AU)

(73) Assignee: International Business Machines Corporation, Armonk, NY (US)

( * ) Notice: Subject to any disclaimer, the term of this patent is extended or adjusted under 35 U.S.C. 154(b) by 137 days.

(21) Appl. No.: 16/180,595

(22) Filed: Nov. 5, 2018

(65) Prior Publication Data

US 2020/0145215 A1    May 7, 2020

(51) Int. Cl.
*G06F 21/31* (2013.01)
*H04L 9/32* (2006.01)
(Continued)

(52) U.S. Cl.
CPC ............ *H04L 9/3226* (2013.01); *G06F 21/31* (2013.01); *G06F 21/45* (2013.01); *H04L 9/0643* (2013.01); *H04L 9/3213* (2013.01)

(58) Field of Classification Search
CPC .......... G06F 21/30; G06F 21/31; G06F 21/45; H04L 63/083; H04L 9/3226; H04L 9/0643; H04L 9/3213
See application file for complete search history.

(56) References Cited

U.S. PATENT DOCUMENTS 6,647,497 B1 * 11/2003 Cromer ................... G06F 21/88
                                                    726/16
8,074,078 B2    12/2011 Brown et al.
(Continued)

OTHER PUBLICATIONS

Guri et al., "Personal Information Leakage During Password Recovery of Internet Services," European Intelligence and Security Informatics Conference (EISIC), Aug. 17-19, 2016, Uppsala, Sweden, pp. 136-139.

(Continued)

*Primary Examiner* — Malcolm Cribbs
(74) *Attorney, Agent, or Firm* — Yee & Associates, P.C.

(57) ABSTRACT

Secure password lock and recovery is provided. A user password is received to access a secure resource protected by a data processing system. It is determined whether a match exists between a retrieved user password verification string corresponding to a valid user password from a storage of a software token and a generated user password verification string corresponding to the user password. In response to determining that a match does not exist between the retrieved user password verification string and the generated user password verification string, it is determined whether a defined number of user password authentication attempts has been exceeded. In response to determining that the defined number of user password authentication attempts has been exceeded, the retrieved user password verification string is set to a preestablished sequence of values locking the valid user password on the storage of the software token. Access to the secure resource is denied.

18 Claims, 10 Drawing Sheets

(51) Int. Cl.
  *G06F 21/45* (2013.01)
  *H04L 9/06* (2006.01)

(56) References Cited

U.S. PATENT DOCUMENTS

| | | | |
|---|---|---|---|
| 8,335,920 B2 | 12/2012 | Jevans | |
| 8,832,453 B2 | 9/2014 | Lord | |
| 10,142,452 B1* | 11/2018 | Liu | G06F 21/31 |
| 2003/0070102 A1* | 4/2003 | Kondo | G06F 21/31 |
| | | | 726/23 |
| 2003/0212871 A1* | 11/2003 | Suzuki | G06F 12/1466 |
| | | | 711/164 |
| 2004/0181696 A1* | 9/2004 | Walker | H04L 63/0846 |
| | | | 726/6 |
| 2005/0223216 A1* | 10/2005 | Chan | H04L 63/0442 |
| | | | 713/153 |
| 2006/0230283 A1* | 10/2006 | McBride | G06F 21/31 |
| | | | 713/184 |
| 2007/0168656 A1* | 7/2007 | Paganetti | G06F 21/31 |
| | | | 713/155 |
| 2007/0192840 A1* | 8/2007 | Pesonen | G06F 21/6218 |
| | | | 726/5 |
| 2008/0040613 A1* | 2/2008 | Challener | H04L 9/0863 |
| | | | 713/185 |
| 2012/0047566 A1* | 2/2012 | Andersson | G06F 21/32 |
| | | | 726/7 |
| 2013/0159699 A1 | 6/2013 | Torkkel | |
| 2014/0237569 A1* | 8/2014 | Zhao | H04L 63/0853 |
| | | | 726/6 |
| 2016/0269440 A1* | 9/2016 | Hartman | H04L 9/14 |
| 2016/0275272 A1* | 9/2016 | Koshinuma | G06F 21/31 |
| 2017/0054699 A1* | 2/2017 | Fukuda | H04L 9/0891 |
| 2017/0140146 A1* | 5/2017 | Mehta | G06F 21/45 |
| 2017/0208075 A1 | 7/2017 | Kerametlian et al. | |
| 2019/0222419 A1* | 7/2019 | Adams | H04L 9/0869 |
| 2020/0026848 A1* | 1/2020 | Ukita | G06F 21/46 |

OTHER PUBLICATIONS

Zhang et al., "The Research on Outlook Password Recovery," Proceedings International Conference on Mechatronic Sciences, Electric Engineering and Computer (MEC), Dec. 20-22, 2013, Shengyang, China, pp. 1715-1719.

Jajodia et al., "Securing Password Recovery Through Dispersion," Fourth International Conference on Computational Aspects of Social Networks (CASoN), Nov. 21-23, 2012, Sao Carlos, Brazil, pp. 228-233.

* cited by examiner

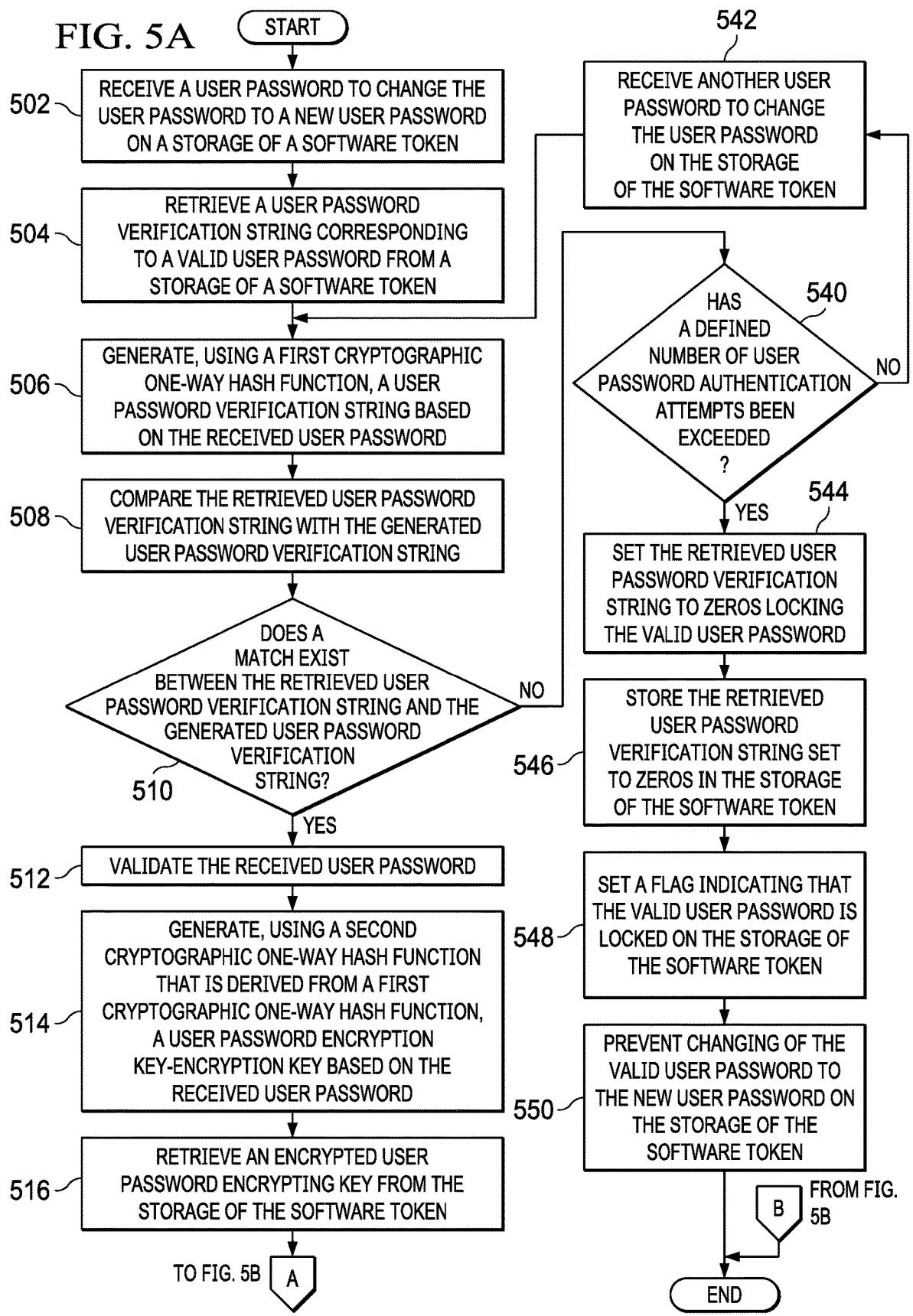

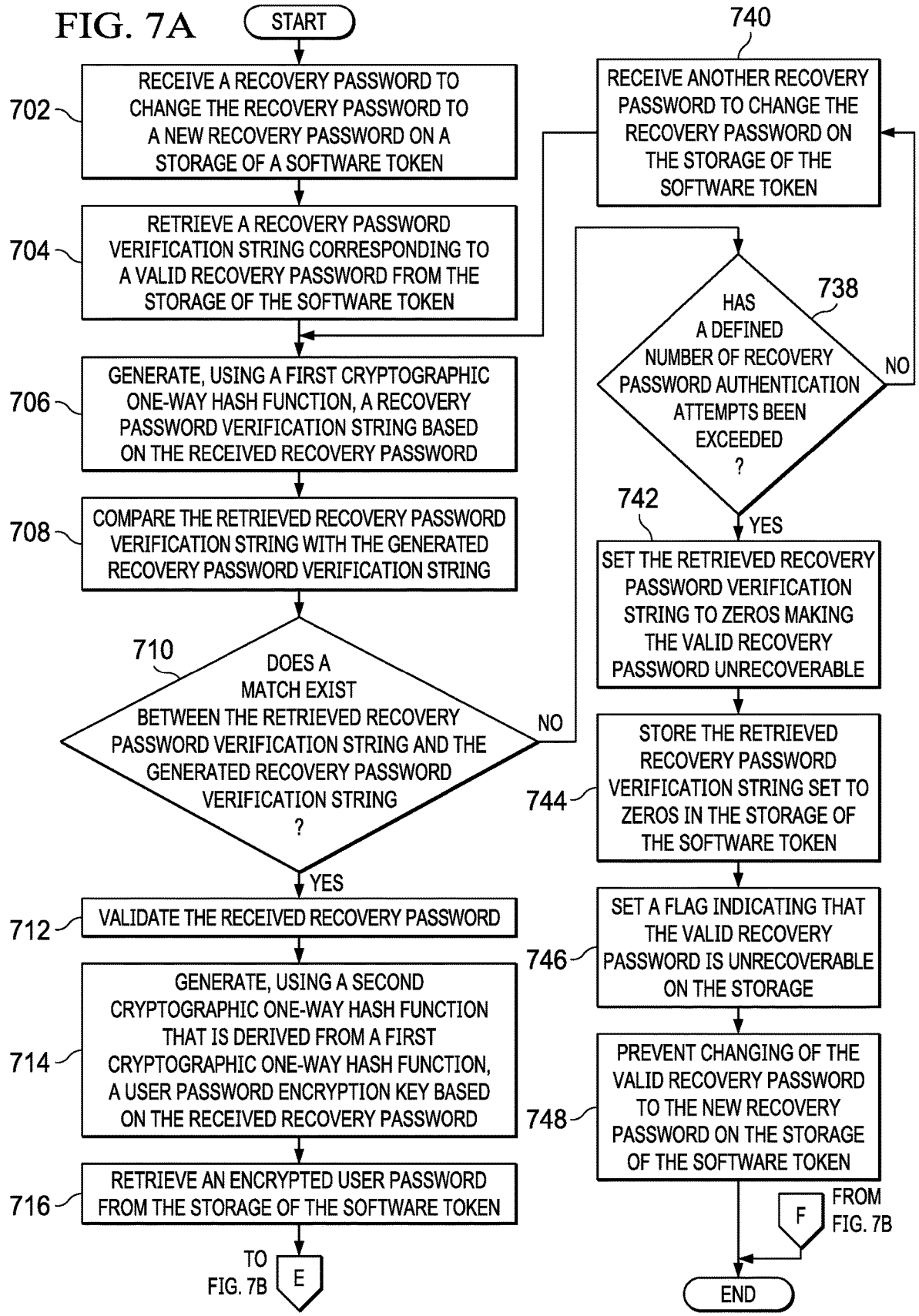

SECURE PASSWORD LOCK AND RECOVERY

BACKGROUND

1. Field

The disclosure relates generally to passwords and more specifically to secure user password lock and locked user password recovery.

2. Description of the Related Art

A password is a string of characters used for user authentication to prove user identity and allow access to a resource, which is kept secure from those not allowed access. A protected resource may be, for example, a secure network; a secure device, such as a processor or storage; a secure application, such as a banking or financial application; a secure document, such as trade secret document; and the like.

Typically, people use passwords during a log in process that controls access to protected resources. A typical person may have many different passwords for many different purposes, such as, for example, logging into online accounts, retrieving e-mails, and accessing applications, databases, networks, or websites.

SUMMARY

According to one illustrative embodiment, a method for secure password lock and recovery is provided. A data processing system receives a user password to access a secure resource protected by the data processing system. The data processing system determines whether a match exists between a retrieved user password verification string corresponding to a valid user password from a storage of a software token and a generated user password verification string corresponding to the received user password. In response to the data processing system determining that a match does not exist between the retrieved user password verification string and the generated user password verification string, the data processing system determines whether a defined number of user password authentication attempts has been exceeded. In response to the data processing system determining that the defined number of user password authentication attempts has been exceeded, the data processing system sets the retrieved user password verification string to a preestablished sequence of values locking the valid user password on the storage of the software token. The data processing system denies access to the secure resource. According to other illustrative embodiments, a data processing system and computer program product for secure password lock and recovery are provided.

BRIEF DESCRIPTION OF THE DRAWINGS

FIGS. 5A-5B are a flowchart illustrating a process for user password change in accordance with an illustrative embodiment;

FIGS. 7A-7B are a flowchart illustrating a process for recovery password change in accordance with an illustrative embodiment.

DETAILED DESCRIPTION

Figure 1:
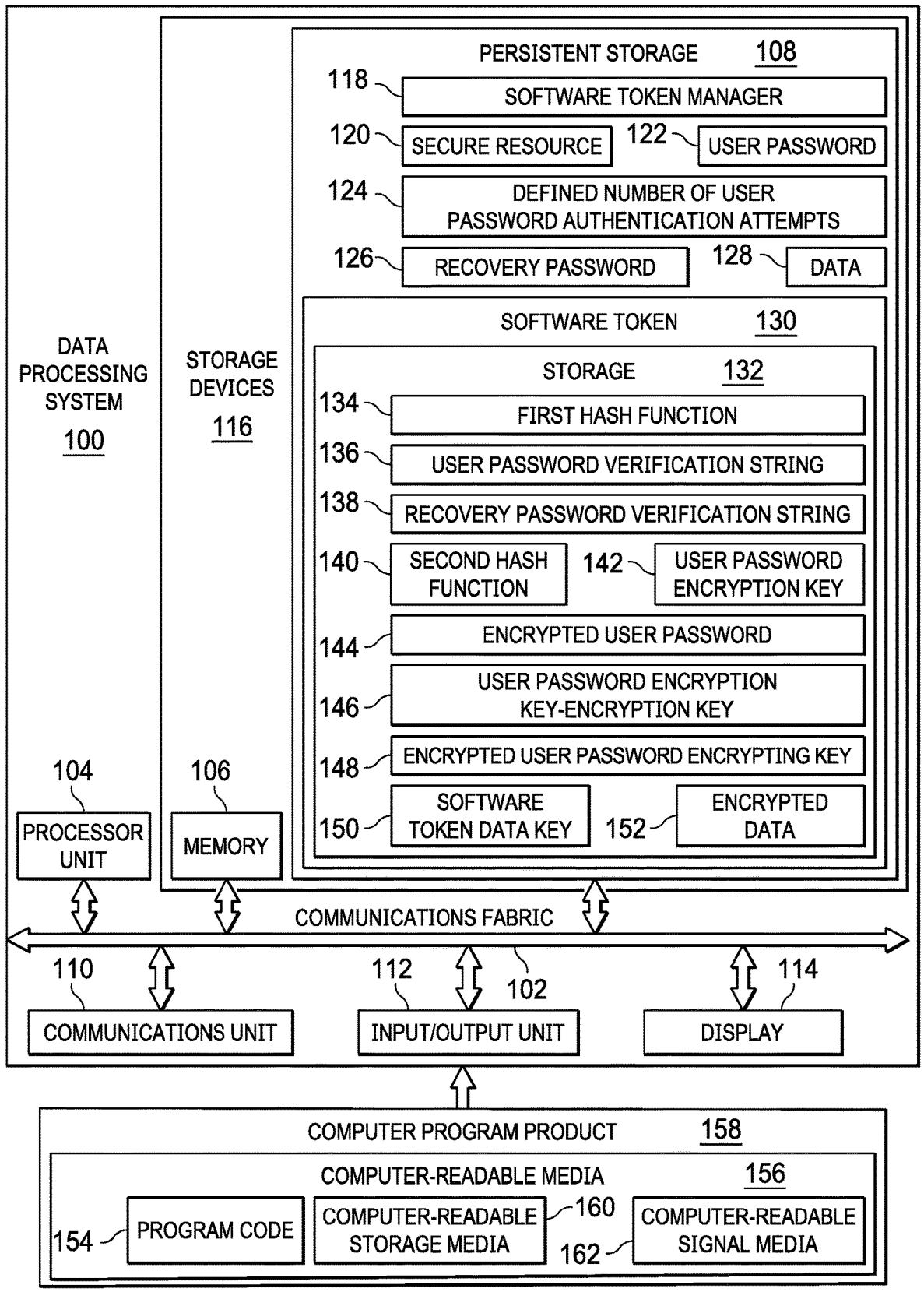
FIG. 1 is a diagram of a data processing system in which illustrative embodiments may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular, with reference to FIG. 1, a diagram of a data processing environment is provided in which illustrative embodiments may be implemented. It should be appreciated that FIG. 1 is only meant as an example and is not intended to assert or imply any limitation with regard to the environments in which different embodiments may be implemented. Many modifications to the depicted environment may be made.

FIG. 1 depicts a diagram of a data processing system in accordance with an illustrative embodiment. Data processing system 100 represents an example of a data processing device, such as a desktop or personal computer, a network computer, a laptop computer, a handheld computer, a personal digital assistant, a smart phone, a smart watch, a smart television, a gaming device, and the like, in which computer readable program code or instructions implementing processes of illustrative embodiments may be located. In addition, data processing system 100 contains or controls one or more secure resources. The one or more secure resources may include, for example: user private or personal data, such as credit card numbers, social security numbers, password wallet, and the like; private documents, such as wills, contracts, birth certificates, and the like; secure applications, such as banking applications, financial applications, governmental applications, and the like; secure processors; secure storage; secure networks; other secure data processing systems; and the like. These secure resources are available for use by one or more users of data processing system 100 when these users input valid user passwords. In this illustrative example, data processing system 100 includes communications fabric 102, which provides communications between processor unit 104, memory 106, persistent storage 108, communications unit 110, input/output (I/O) unit 112, and display 114.

Processor unit 104 serves to execute instructions for software applications and programs that may be loaded into memory 106. Processor unit 104 may be a set of one or more hardware processor devices or may be a multi-core processor, depending on the particular implementation.

Memory 106 and persistent storage 108 are examples of storage devices 116. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 106, in these examples, may be, for example, a random-access memory (RAM), or any other suitable volatile or non-volatile storage device. Persistent storage 108 may take various forms, depending on the particular implementation. For example, persistent storage 108 may contain one or more devices. For example, persistent storage 108 may be a hard drive, a flash memory, a rewritable optical disk, a rewritable magnetic tape, or some combination of the above. The media used by persistent storage 108 may be removable. For example, a removable hard drive may be used for persistent storage 108.

In this example, persistent storage 108 stores software token manager 118. However, it should be noted that even though software token manager 118 is illustrated as residing in persistent storage 108, in an alternative illustrative embodiment software token manager 118 may be a separate component of data processing system 100. For example, software token manager 118 may be a hardware component coupled to communication fabric 102 or a combination of hardware and software components.

Software token manager 118 controls the processes of generating, initializing, and managing software tokens on data processing system 100. In addition, software token manager 118 controls the processes of secure resource access, secure user password lock, and secure locked user password recovery. Secure resource 120 represents a unique identifier for a secure resource protected by user password 122. However, it should be noted that secure resource 120 may represent unique identifiers for a set of one or more same or different secure resources protected by user password 122. A user of data processing system 100 creates user password 122. User password 122 may consist of any number and combination of letters, numbers, special characters, and/or symbols.

The user of data processing system 100 utilizes user password 122 to access secure resource 120. However, software token manager 118 limits the number of user password authentication attempts by utilizing defined number of user password authentication attempts 124. Defined number of user password authentication attempts 124 represents a predefined number of tries, such as, for example, two, three, four, five, ten, or the like, that the user of data processing system 100 may input an incorrect user password before software token manager 118 locks user password 122.

In the event that the user of data processing system 100 exceeds defined number of user password authentication attempts 124 and software token manager 118 locks user password 122, software token manager 118 will require the input of recovery password 126. Recovery password 126 represents a different password (i.e., different from user password 122) that software token manager 118 utilizes to unlock and recover user password 122 after having been locked. A recovery administrator user corresponding to data processing system 100 creates recovery password 126. Alternatively, software token manager 118 may randomly generate recovery password 126 and provide recovery password 126 to the recovery administrator user. Also, it should be noted that the recovery administrator user may be the same as the normal user of data processing system 100 or may be a trusted entity corresponding to data processing system 100.

Initialization of software token 130 requires setting both user password 122 and recovery password 126. It should be noted that recovery password 126 is only ever known and entered by the user. Only user password 122 is "securely" stored (i.e., encrypted) on software token 130. Password verification strings 136 and 138 are stored on software token 130 for both user and recovery passwords 122 and 126, respectively, but these passwords can never be recovered from the verification strings. Further, software token manager 118 only requires input of recovery password 126 during the process of unlocking user password 122.

In addition, it should be noted that an already initialized software token can be re-initialized, but software token manager 118 would have to perform an explicit reset of the already initialized software token by, for example, setting both verification strings for user password 122 and recovery password 126 to a preestablished sequence of values, such as, for example, all zeros, and then setting a flag to indicate the software token is un-initialized. This may then represent a default state of a new software token. However, it should be noted that the preestablished sequence of values may be any sequence of values, such as numbers, letters, special characters, symbols, or any combination thereof.

Data 128 represent information, such as personal or private information, that the user of data processing system 100 wants to securely store in storage 132 of software token 130. Software token 130 represents a software emulation of a hardware access device, such as, for example, a security token or key fob. Storage 132 represents a secure data storage location on software token 130.

Software token manager 118 utilizes first hash function 134 to generate user password verification string 136 based on user password 122. First hash function 134 is a cryptographic one-way hash function that turns a password into a fixed string of digits, which makes it nearly impossible to derive the password from the fixed string of digits. In other words, user password verification string 136 is a hash of user password 122. Software token manager 118 utilizes user password verification string 136 to validate user password 122 during a request to access secure resource 120.

Further, software token manager 118 utilizes first hash function 134 to generate recovery password verification string 138 based on recovery password 126. In other words, recovery password verification string 138 is a hash of recovery password 126. Software token manager 118 utilizes recovery password verification string 138 to validate recovery password 126 during a request to unlock user password 122.

Software token manager 118 utilizes second hash function 140 to generate user password encryption key 142 based on recovery password 126. Second hash function 140 also is a cryptographic one-way hash function that software token manager 118 derives from first hash function 134 using the equation W'(a)=W((a+−1)mod 2), where "W'" is second hash function 140, "W" is first hash function 134, and "a" is recovery password 126. In other words, software token manager 118 is applying first hash function 134 to the one's complement of recovery password 126. This is a generalization and is used as an example of generation of different hashes from the same password. However, software token manager 118 may use other methods (e.g., See Request for Comments (RFC) 2898). This is done so that software token manager 118 can make multiple derivations from recovery password 126 that are not equal and cannot be derived from each other due to the properties of first hash function 134.

It should be noted that in situations where storage of the hashes is accessible in an unrestricted way, then additional safe guards for the protection against off-line dictionary attacks, such as using random salt values, would be employed (e.g., See RFC 2898). Additionally, to prevent modification or replacement of stored hash values, write access to such storage would be restricted to trusted processes.

Moreover, software token manager 118 encrypts user password 122 utilizing user password encryption key 142 to form encrypted user password 144. Further, software token manager 118 utilizes second hash function 140 to generate user password encryption key-encryption key 146 based on user password 122. Furthermore, software token manager 118 encrypts user password encryption key 142 utilizing user password encryption key-encryption key 146 to form encrypted user password encrypting key 148. Moreover, software token manager 118 utilizes software token data key 150 to encrypt data 128 to form encrypted data 152. Software token manager 118 derives software token data key 150 based on user password 122.

Communications unit 110, in this example, provides for communication with other data processing systems, computers, and devices via a network, such as network 102 in FIG. 1. Communications unit 110 may provide communications through the use of both physical and wireless communications links. The physical communications link may utilize, for example, a wire, cable, universal serial bus, or any other physical technology to establish a physical communications link for data processing system 100. The wireless communications link may utilize, for example, shortwave, high frequency, ultra high frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, fifth-generation (5G), or any other wireless communication technology or standard to establish a wireless communications link for data processing system 100.

Input/output unit 112 allows for the input and output of data with other devices that may be connected to data processing system 100. For example, input/output unit 112 may provide a connection for user input through a keypad, a keyboard, a mouse, a microphone, and/or some other suitable input device. Display 114 provides a mechanism to display information to a user and may include touch screen capabilities to allow the user to make on-screen selections through user interfaces or input data, such as, for example, passwords.

Instructions for the operating system, applications, and/or programs may be located in storage devices 116, which are in communication with processor unit 104 through communications fabric 102. In this illustrative example, the instructions are in a functional form on persistent storage 108. These instructions may be loaded into memory 106 for running by processor unit 104. The processes of the different embodiments may be performed by processor unit 104 using computer-implemented instructions, which may be located in a memory, such as memory 106. These program instructions are referred to as program code, computer usable program code, or computer readable program code that may be read and run by a processor in processor unit 104. The program instructions, in the different embodiments, may be embodied on different physical computer readable storage devices, such as memory 106 or persistent storage 108.

Program code 154 is located in a functional form on computer readable media 156 that is selectively removable and may be loaded onto or transferred to data processing system 100 for running by processor unit 104. Program code 154 and computer readable media 156 form computer program product 158. In one example, computer readable media 156 may be computer readable storage media 160 or computer readable signal media 162. Computer readable storage media 160 may include, for example, an optical or magnetic disc that is inserted or placed into a drive or other device that is part of persistent storage 108 for transfer onto a storage device, such as a hard drive, that is part of persistent storage 108. Computer readable storage media 160 also may take the form of a persistent storage, such as a hard drive, a thumb drive, or a flash memory that is connected to data processing system 100. In some instances, computer readable storage media 160 may not be removable from data processing system 100.

Alternatively, program code 154 may be transferred to data processing system 100 using computer readable signal media 162. Computer readable signal media 162 may be, for example, a propagated data signal containing program code 154. For example, computer readable signal media 162 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 154 may be downloaded over a network to persistent storage 108 from another device or data processing system through computer readable signal media 162 for use within data processing system 100. For instance, program code stored in a computer readable storage media in a data processing system may be downloaded over a network from the data processing system to data processing system 100. The data processing system providing program code 154 may be a server computer, a client computer, or some other device capable of storing and transmitting program code 154.

The different components illustrated for data processing system 100 are not meant to provide architectural limitations to the manner in which different embodiments may be implemented. The different illustrative embodiments may be implemented in a data processing system including components in addition to, or in place of, those illustrated for data processing system 100. Other components shown in FIG. 1 can be varied from the illustrative examples shown. The different embodiments may be implemented using any hardware device or system capable of executing program code. As one example, data processing system 100 may include organic components integrated with inorganic components and/or may be comprised entirely of organic components excluding a human being. For example, a storage device may be comprised of an organic semiconductor.

As another example, a computer readable storage device in data processing system 100 is any hardware apparatus that may store data. Memory 106, persistent storage 108, and computer readable storage media 160 are examples of physical storage devices in a tangible form.

In another example, a bus system may be used to implement communications fabric 102 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 106 or a cache such as found in an interface and memory controller hub that may be present in communications fabric 102.

Illustrative embodiments provide an ability to lockout a data processing system user from accessing the user's software token data after a certain number of failed authentication attempts, as well as providing an ability for the user to recover the user's password in the event that the user's password is locked (e.g., the user has forgotten the password). Illustrative embodiments pertain to software cryptographic tokens, such as, for example, cryptographic application programming interfaces with key storage, which recognize normal users and recovery administrator users by username and password. A normal user is one who makes day-to-day use of the software cryptographic token and a recovery administrator user is one whose only function is to effect a password recovery for a normal user and not to perform a password reset. The software cryptographic token also performs an access lockout after a defined number of wrong password authentication attempts by the normal user. In the event of normal user access lockout, the software cryptographic token requires a recovery password from the recovery administrator user to re-establish normal user access. It should be noted that the normal user and the recovery administrator user may be the same identity. Alternatively, the recovery administrator user is someone who the normal user trusts or is required to trust to recover the normal user's password. If the normal user does not trust a recovery administrator user, then the normal user should be aware that any holder of the recovery password can recover the user's password. Illustrative embodiments may utilize multiple recovery passwords to provide redundancy and simply require selection of a particular recovery identity to reduce it to a single recovery password case.

The software cryptographic token is an emulation of a physical access token, such as, for example, a smart card. Such physical access tokens include an onboard processor and key storage and provide a physical solution to secure resource access. However, illustrative embodiments do not pertain to physical access tokens, but instead pertain to software emulations of physical access tokens. The software emulation of a physical access token by illustrative embodiments securely maintains the data contents of the software token using cryptographic keys that illustrative embodiments derive from passwords of normal users. Thus, it should be noted that the term software token as used herein refers to a software emulation of a physical access token and does not refer to a physical access token.

Various solutions to secure resource access currently exist, but each of these current solutions have issues. For example, if a user fails to enter the correct user password after a defined number of attempts, then access will be blocked for the application attempting to make the secure resource access. A lock is said to be applied in this case, but it is not a real lock as it is only a state change in the memory of the running application. The memory state change only prevents subsequent user password attempts for that application. One issue with this solution is that a simple restart would be enough to effect an unlock and allow more user password attempts by another instance of the application.

As another example, when a user forgets a password, the only option is for an administrator to perform a password reset. Currently, there is no way for the current user password to be recovered. This is inconvenient because the user has to create a new password whenever the user forgets the current user password. In addition, a new user password may prevent access to a secure resource, such as data, protected by the old user password when the data was secured by a cryptographic key directly derived from the old user password.

As a further example, when a user needs to change a password, the user is unable to change the password without needing the administrator's recovery password. As user password changes may be needed frequently, it is inconvenient for the administrator to provide the recovery password every time.

Illustrative embodiments utilize software tokens to store data securely under a cryptographic key that illustrative embodiments derive from the user password and to recover that user password and other secured data using a recovery password (i.e., a recovery administrator user's recovery password that is different from the user's password). Illustrative embodiments utilize the recovery password during initialization of the software token and during user password unlock in the event of a forgotten password. Further, illustrative embodiments utilize cryptographic one-way hash functions, encryption functions, and decryption functions to achieve password and data security.

Furthermore, illustrative embodiments allow a user to change user password without knowledge of the recovery password. Illustrative embodiments also allow recovery password change without effecting the user password. If a user fails to enter the correct user password within a defined number of password authentication attempts, illustrative embodiments alter data of the software token to effectively apply a user password lock, which only an authorized unlock, requiring the recovery password, can reverse. The alteration of the software token data by illustrative embodiments destroys the ability of the software token to verify the user password and, therefore, the user cannot be verified, which prevents the user from further access to the software token. In other words, the software token is now cryptographically locked.

Figure 2:
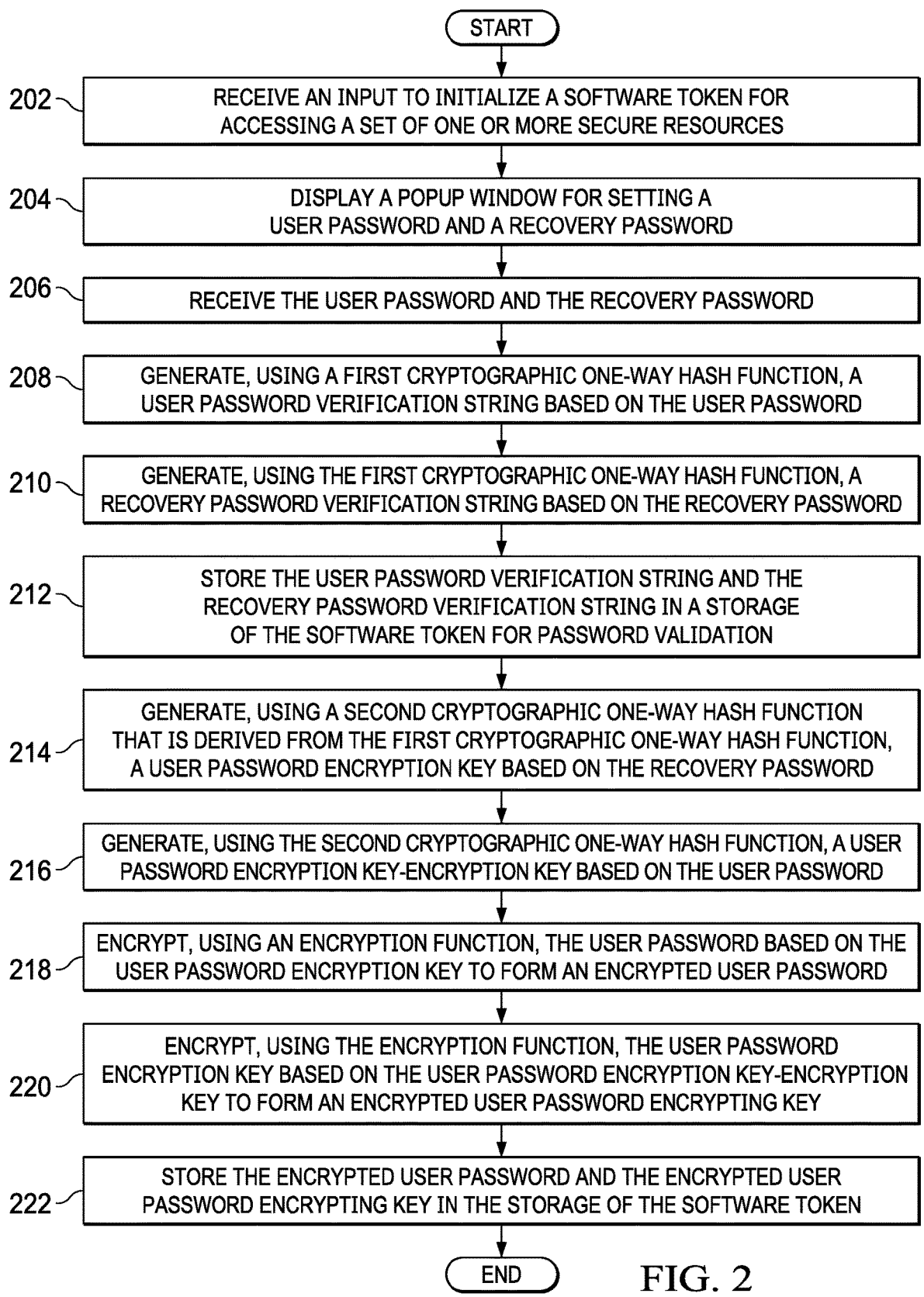
FIG. 2 is a flowchart illustrating a process for software token initialization in accordance with an illustrative embodiment.

With reference now to FIG. 2, a flowchart illustrating a process for software token initialization is shown in accordance with an illustrative embodiment. The process shown in FIG. 2 may be implemented in a data processing system, such as, for example, data processing system 100 in FIG. 1.

The process begins when the data processing system receives an input to initialize a software token for accessing a set of one or more secure resources protected by the data processing system (step 202). The software token may be, for example, software token 130 in FIG. 1. The data processing system displays a popup window for setting a user password and a recovery password (step 204). Subsequently, the data processing system receives the user password and the recovery password (step 206).

The data processing system, using a first cryptographic one-way hash function, generates a user password verification string based on the user password (step 208). In addition, the data processing system, using the same first cryptographic one-way hash function, generates a recovery password verification string based on the recovery password (step 210). The data processing system stores the user password verification string and the recovery password verification string in a storage of the software token for future password validation (step 212). The storage of the software token may be, for example, storage 132 in FIG. 1.

Further, the data processing system, using a second cryptographic one-way hash function that is derived from the first cryptographic one-way hash function, generates a user password encryption key based on the recovery password (step 214). The data processing system, using the same second cryptographic one-way hash function derived from the first cryptographic one-way hash function, also generates a user password encryption key-encryption key based on the user password (step 216).

Furthermore, the data processing system, using an encryption function, encrypts the user password based on the user password encryption key to form an encrypted user password (step 218). It should be noted that a decryption function ("D") exists for the encryption function ("E") such that $Dk(Ek(x))$ is an identity function for all x in the domain of the Key "k" (i.e., $x=Dk(Ek(x))$). The data processing system, using the encryption function, also encrypts the user password encryption key based on the user password encryption key-encryption key to form an encrypted user password encrypting key (step 220). The data processing system stores the encrypted user password and the encrypted user password encrypting key in the storage of the software token (step 222). Thereafter, the process terminates.

Figure 3:
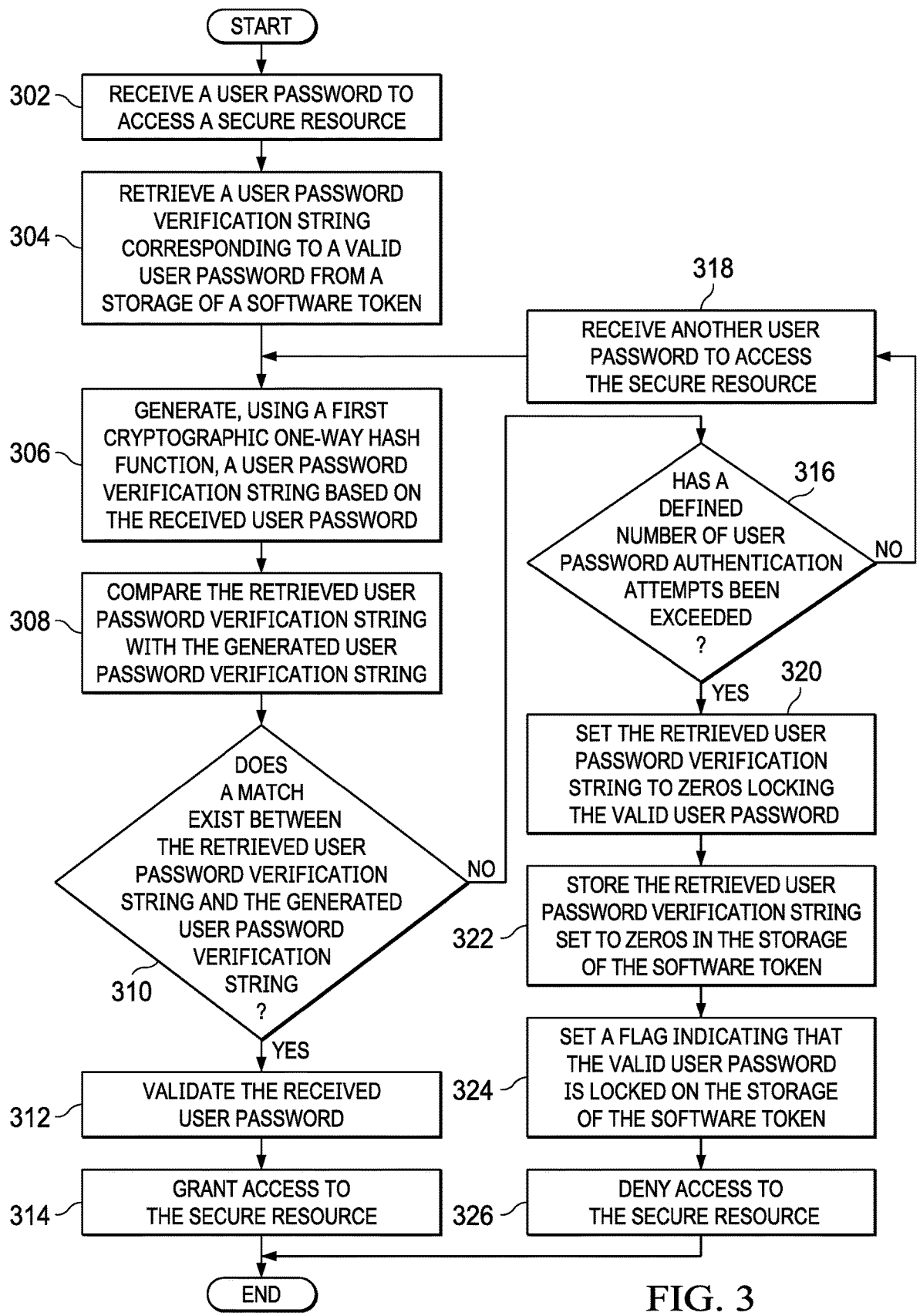
FIG. 3 is a flowchart illustrating a process for verifying and locking a user password in accordance with an illustrative embodiment.

With reference now to FIG. 3, a flowchart illustrating a process for verifying and locking a user password is shown in accordance with an illustrative embodiment. The process shown in FIG. 3 may be implemented in a data processing system, such as, for example, data processing system 100 in FIG. 1.

The process begins when the data processing system receives a user password to access a secure resource protected by the data processing system from a user of the data processing system to form a received user password (step 302). The data processing system retrieves a user password verification string corresponding to a valid user password from a storage of a software token contained in the data processing system (step 304). In addition, the data processing system, using a first cryptographic one-way hash function, generates a user password verification string based on the received user password (step 306).

The data processing system compares the retrieved user password verification string with the generated user password verification string (step 308). Afterward, the data processing system makes a determination as to whether a match exists between the retrieved user password verification string and the generated user password verification string (step 310).

If the data processing system determines that a match does exist between the retrieved user password verification string and the generated user password verification string, yes output of step 310, then the data processing system validates the received user password (step 312). Further, in response to validating the user password, the data processing system grants access to the secure resource protected by the data processing system (step 314). Thereafter, the process terminates.

If the data processing system determines that a match does not exist between the retrieved user password verification string and the generated user password verification string, no output of step 310, then the data processing system makes a determination as to whether a defined number of user password authentication attempts has been exceeded (step 316). If the data processing system determines that the defined number of user password authentication attempts has not been exceeded, no output of step 316, then the data processing system receives another user password to access the secure resource protected by the data processing system (step 318). Thereafter, the process returns to step 306 where the data processing system generates another user password verification string based on the newly received user password.

If the data processing system determines that the defined number of user password authentication attempts has been exceeded, yes output of step 316, then the data processing system sets the retrieved user password verification string to all zeros locking the valid user password (step 320). However, it should be noted that the data processing system may alternatively set the retrieved user password verification string to any preestablished sequence of values to lock the valid user password. As a result, user password verification is now destroyed and cannot be verified. The data processing system stores the retrieved user password verification string set to all zeros in the storage of the software token (step 322). In situations where the storage of such user password verification string data is accessible, then additional safe guards for the protection against modification would be employed, such as, for example, restriction of write access to trusted processes. The data processing system also sets a flag indicating that the valid user password is locked on the storage of the software token (step 324). Furthermore, the data processing system denies access to the secure resource protected by the data processing system (step 326). Thereafter, the process terminates.

Figure 4:
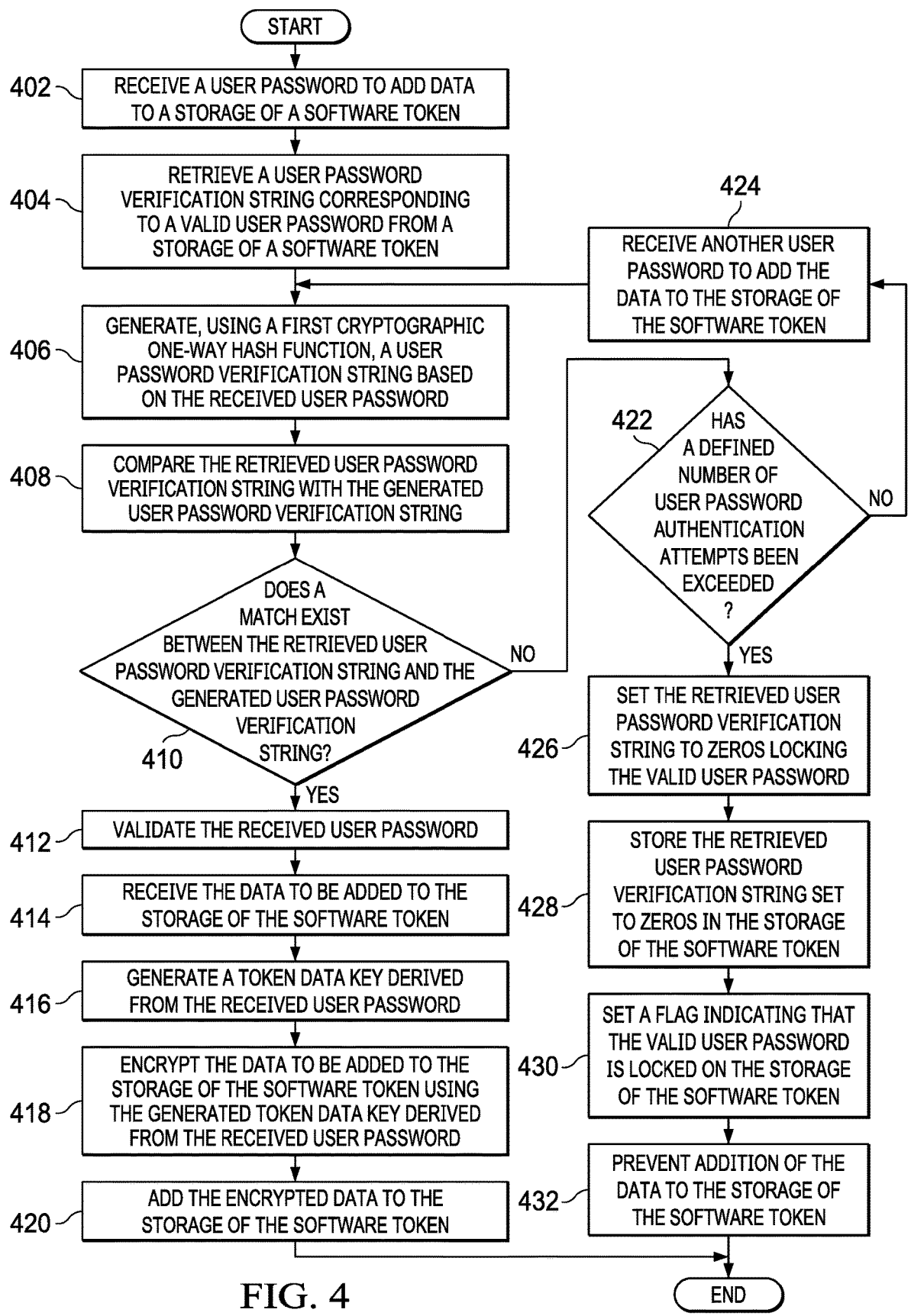
FIG. 4 is a flowchart illustrating a process for addition of data to a software token in accordance with an illustrative embodiment.

With reference now to FIG. 4, a flowchart illustrating a process for addition of data to a software token is shown in accordance with an illustrative embodiment. The process shown in FIG. 4 may be implemented in a data processing system, such as, for example, data processing system 100 in FIG. 1.

The process begins when the data processing system receives a user password to add data to a storage of a software token from a user of the data processing system (step 402). The data may be any type of data, such as personal data of the user, and may be, for example, data 128 in FIG. 1. The data processing system retrieves a user password verification string corresponding to a valid user password from the storage of the software token (step 404). In addition, the data processing system, using a first cryptographic one-way hash function, generates a user password verification string based on the received user password (step 406).

The data processing system compares the retrieved user password verification string with the generated user password verification string (step 408). Afterward, the data processing system makes a determination as to whether a match exists between the retrieved user password verification string and the generated user password verification string (step 410).

If the data processing system determines that a match does exist between the retrieved user password verification string and the generated user password verification string, yes output of step 410, then the data processing system validates the received user password (step 412). Further, in response to validating the user password, the data processing system receives the data to be added to the storage of the software token (step 414). Furthermore, the data processing system generates a token data key derived from the received user password (step 416).

Afterward, the data processing system encrypts the data to be added to the storage of the software token using the generated token data key derived from the received user password (step 418). Alternatively, the data processing system may encrypt the data to be added to the storage using a second token data key protected by the token data key derived from the user password. Without the correct user password, the data is not recoverable and its integrity is protected. The encryption function or the cryptographic key derivation derived from the user password is based on, for example, a Password Based Encryption Scheme as described in RFC 2898. The integrity checking/protection is based on, for example, a keyed-hash message authentication code or hash-based message authentication code function as described in RFC 2104. The data processing system adds the encrypted data to the storage of the software token (step 420). Thereafter, the process terminates.

Returning again to step 410, if the data processing system determines that a match does not exist between the retrieved user password verification string and the generated user password verification string, no output of step 410, then the data processing system makes a determination as to whether a defined number of user password authentication attempts has been exceeded (step 422). If the data processing system determines that the defined number of user password authentication attempts has not been exceeded, no output of step 422, then the data processing system receives another user password to add the data to the storage of the software token (step 424). Thereafter, the process returns to step 406 where the data processing system generates another user password verification string based on the newly received user password.

If the data processing system determines that the defined number of user password authentication attempts has been exceeded, yes output of step 422, then the data processing system sets the retrieved user password verification string to all zeros locking the valid user password (step 426). The data processing system stores the retrieved user password verification string set to all zeros in the storage of the software token (step 428). The data processing system also sets a flag indicating that the valid user password is locked on the storage of the software token (step 430). Furthermore, the data processing system prevents addition of the data to the storage of the software token (step 432). Thereafter, the process terminates.

Figure 5B:
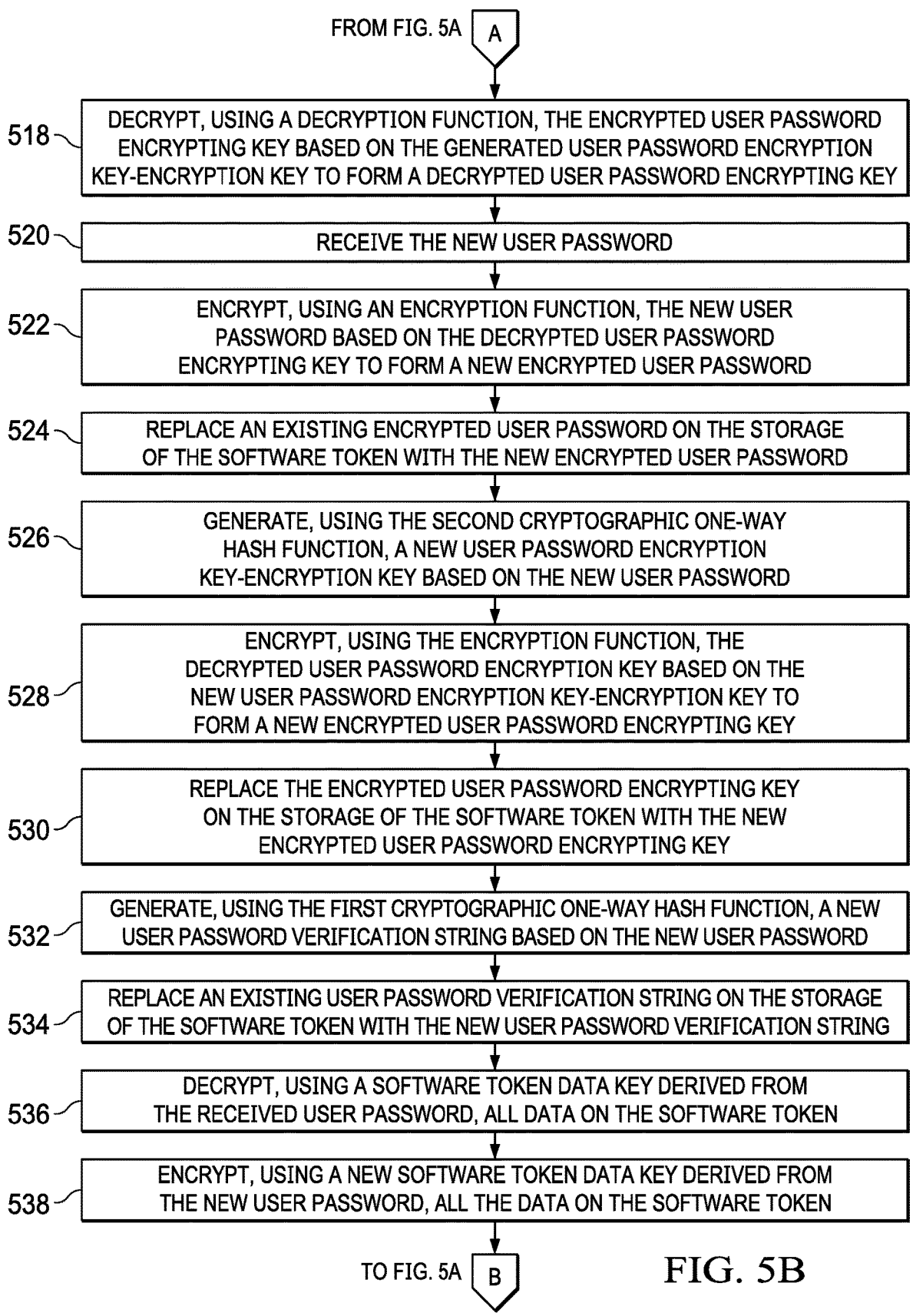

With reference now to FIGS. 5A-5B, a flowchart illustrating a process for user password change is shown in accordance with an illustrative embodiment. The process shown in FIGS. 5A-5B may be implemented in a data processing system, such as, for example, data processing system 100 in FIG. 1.

The process begins when the data processing system receives a user password to change the user password to a new user password on a storage of a software token from a user of the data processing system (step 502). The data processing system retrieves a user password verification string corresponding to a valid user password from the storage of the software token (step 504). In addition, the data processing system, using a first cryptographic one-way hash function, generates a user password verification string based on the received user password (step 506).

The data processing system compares the retrieved user password verification string with the generated user password verification string (step 508). Afterward, the data processing system makes a determination as to whether a match exists between the retrieved user password verification string and the generated user password verification string (step 510).

If the data processing system determines that a match does exist between the retrieved user password verification string and the generated user password verification string, yes output of step 510, then the data processing system validates the received user password (step 512). Further, the data processing system, using a second cryptographic one-way hash function that is derived from a first cryptographic one-way hash function, generates a user password encryption key-encryption key based on the received user password (step 514). The data processing system also retrieves an encrypted user password encrypting key from the storage of the software token (step 516). The data processing system, using a decryption function, decrypts the encrypted user password encrypting key based on the generated user password encryption key-encryption key to form a decrypted user password encrypting key (step 518).

The data processing system receives the new user password (step 520). Then, the data processing system, using an encryption function, encrypts the new user password based on the decrypted user password encrypting key to form a new encrypted user password (step 522). Afterward, the data processing system replaces an existing encrypted user password on the storage of the software token with the new encrypted user password (step 524).

Moreover, the data processing system, using the same second cryptographic one-way hash function derived from the first cryptographic one-way hash function, generates a new user password encryption key-encryption key based on the new user password (step 526). The data processing system, using the same encryption function, encrypts the decrypted user password encryption key based on the new user password encryption key-encryption key to form a new encrypted user password encrypting key (step 528). Then, the data processing system replaces the encrypted user password encrypting key retrieved from the storage of the software token with the new encrypted user password encrypting key (step 530).

Further, the data processing system, using the same first cryptographic one-way hash function, generates a new user password verification string based on the new user password (step 532). Subsequently, the data processing system replaces an existing user password verification string on the storage of the software token with the new user password verification string (step 534). In addition, the data processing system, using a software token data key derived from the received user password, decrypts all data on the software token (step 536). Afterward, the data processing system, using a new software token data key derived from the new user password, encrypts all the data on the software token (step 538). Thereafter, the process terminates.

Returning again to step 510, if the data processing system determines that a match does not exist between the retrieved user password verification string and the generated user password verification string, no output of step 510, then the data processing system makes a determination as to whether a defined number of user password authentication attempts has been exceeded (step 540). If the data processing system determines that the defined number of user password authentication attempts has not been exceeded, no output of step 540, then the data processing system receives another user password to change the user password on the storage of the software token (step 542). Thereafter, the process returns to step 506 where the data processing system generates another user password verification string based on the newly received user password.

If the data processing system determines that the defined number of user password authentication attempts has been exceeded, yes output of step 540, then the data processing system sets the retrieved user password verification string to all zeros locking the valid user password (step 544). The data processing system stores the retrieved user password verification string set to all zeros in the storage of the software token (step 546). The data processing system also sets a flag indicating that the valid user password is locked on the storage of the software token (step 548). Furthermore, the data processing system prevents changing of the valid user password to the new user password on the storage of the software token (step 550). Thereafter, the process terminates.

Figure 6A:
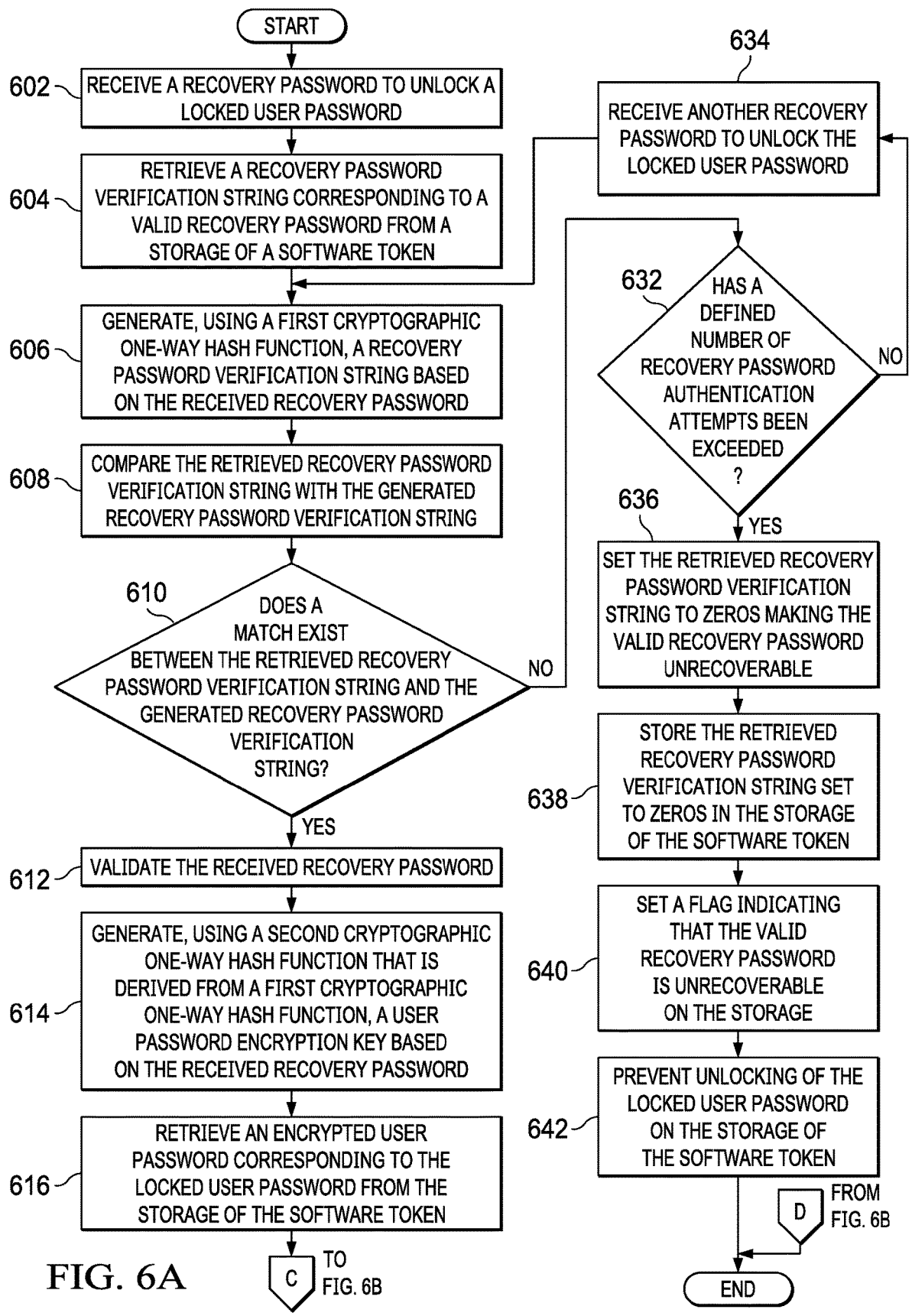
FIGS. 6A-6B are a flowchart illustrating a process for user password unlock in accordance with an illustrative embodiment.
Figure 6B:
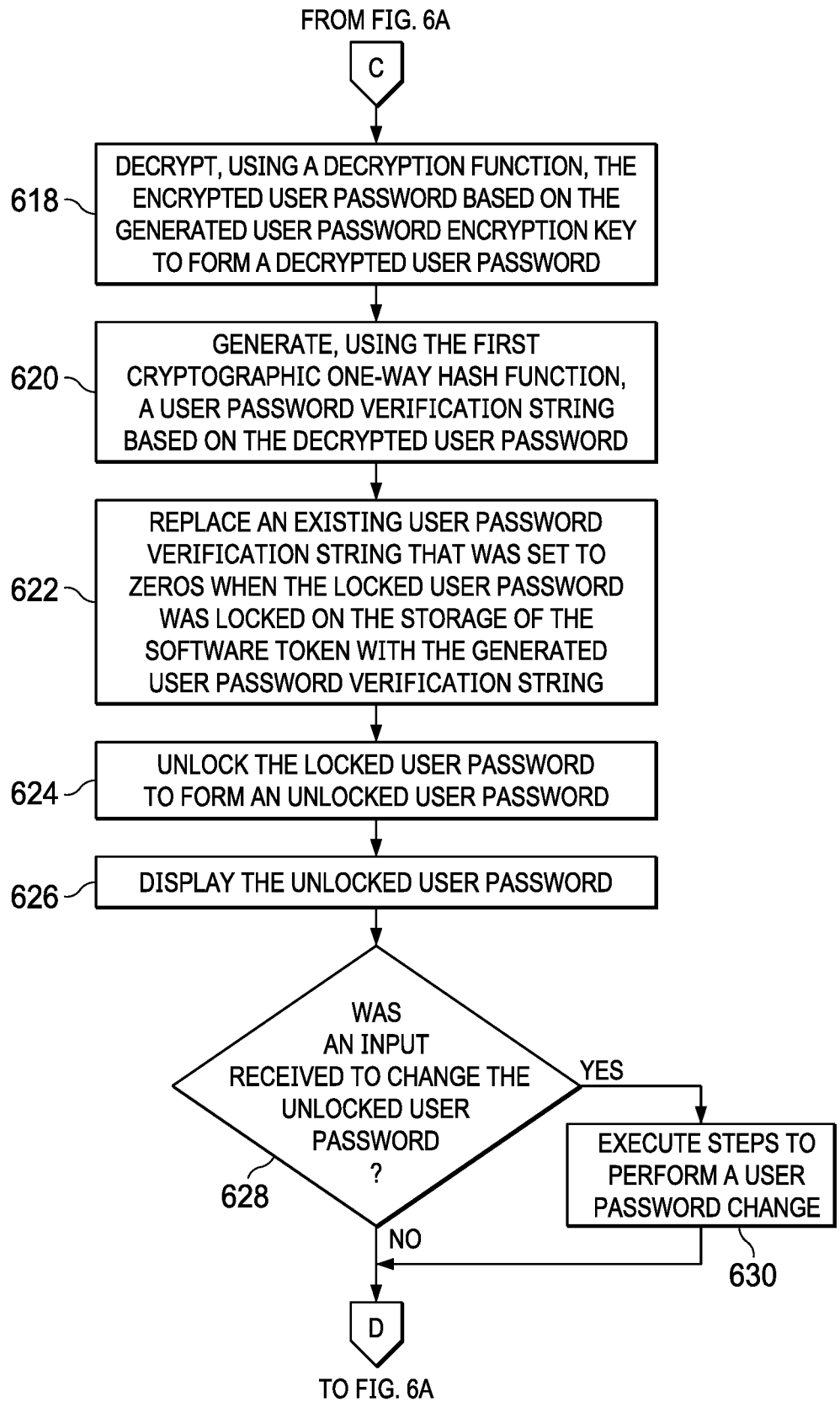

With reference now to FIGS. 6A-6B, a flowchart illustrating a process for user password unlock is shown in accordance with an illustrative embodiment. The process shown in FIGS. 6A-6B may be implemented in a data processing system, such as, for example, data processing system 100 in FIG. 1.

The process begins when the data processing system receives a recovery password to unlock a locked user password from an administrative user corresponding to the data processing system to form a received recovery password (step 602). The data processing system retrieves a recovery password verification string corresponding to a valid recovery password from a storage of a software token (step 604). In addition, the data processing system, using a first cryptographic one-way hash function, generates a recovery password verification string based on the received recovery password (step 606).

The data processing system compares the retrieved recovery password verification string with the generated recovery password verification string (step 608). Afterward, the data processing system makes a determination as to whether a match exists between the retrieved recovery password verification string and the generated recovery password verification string (step 610).

If the data processing system determines that a match does exist between the retrieved recovery password verification string and the generated recovery password verification string, yes output of step 610, then the data processing system validates the received recovery password (step 612). Further, the data processing system, using a second cryptographic one-way hash function that is derived from a first cryptographic one-way hash function, generates a user password encryption key based on the received recovery password (step 614). The data processing system also retrieves an encrypted user password corresponding to the locked user password from the storage of the software token (step 616).

The data processing system, using a decryption function, decrypts the encrypted user password based on the generated user password encryption key to form a decrypted user password (step 618). The data processing system, using the same first cryptographic one-way hash function, generates a user password verification string based on the decrypted user password (step 620). Then, the data processing system replaces an existing user password verification string that was set to all zeros when the locked user password was locked on the storage of the software token with the generated user password verification string (step 622).

Subsequently, the data processing system unlocks the locked user password to form an unlocked user password (step 624). The data processing system displays the unlocked user password on a display device, such as, for example, display 114 of FIG. 1, of the data processing system (step 626). Afterward, the data processing system makes a determination as to whether an input was received to change the unlocked user password (step 628). If the data processing system determines that an input was received to change the unlocked user password, yes output of step 628, then the data processing system executes steps to perform a user password change (step 630). The steps to change the user password are found in the flowchart of FIGS. 5A-5B. If the data processing system determines that no input was received to change the unlocked user password, no output of step 628, then the process terminates thereafter.

Returning again to step 610, if the data processing system determines that a match does not exist between the retrieved recovery password verification string and the generated recovery password verification string, no output of step 610, then the data processing system makes a determination as to whether a defined number of recovery password authentication attempts has been exceeded (step 632). If the data processing system determines that the defined number of recovery password authentication attempts has not been exceeded, no output of step 632, then the data processing system receives another recovery password to unlock the locked user password (step 634). Thereafter, the process returns to step 606 where the data processing system generates another recovery password verification string based on the newly received recovery password.

If the data processing system determines that the defined number of recovery password authentication attempts has been exceeded, yes output of step 632, then the data processing system sets the retrieved recovery password verification string to all zeros making the valid recovery password unrecoverable (step 636). The data processing system stores the retrieved recovery password verification string set to all zeros in the storage of the software token (step 638). The data processing system also sets a flag indicating that the valid recovery password is unrecoverable on the storage of the software token (step 640). Furthermore, the data processing system prevents unlocking of the locked user password on the storage of the software token (step 642). Thereafter, the process terminates.

Figure 7B:
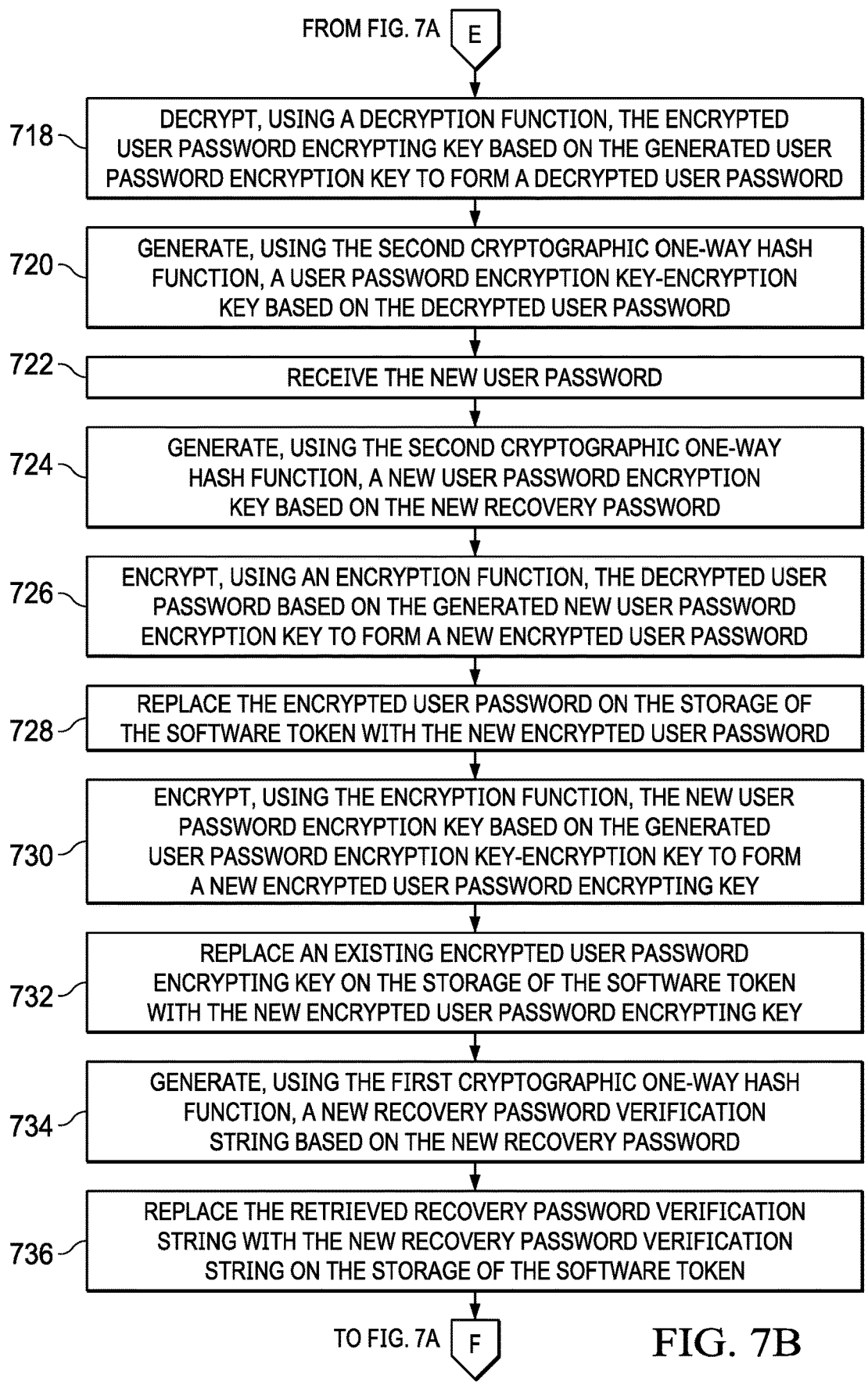

With reference now to FIGS. 7A-7B, a flowchart illustrating a process for recovery password change is shown in accordance with an illustrative embodiment. The process shown in FIGS. 7A-7B may be implemented in a data processing system, such as, for example, data processing system 100 in FIG. 1.

The process begins when the data processing system receives a recovery password to change the recovery password to a new recovery password on a storage of a software token from an administrative user of the data processing system (step 702). The data processing system retrieves a recovery password verification string corresponding to a valid recovery password from the storage of the software token (step 704). In addition, the data processing system, using a first cryptographic one-way hash function, generates a recovery password verification string based on the received recovery password (step 706).

The data processing system compares the retrieved recovery password verification string with the generated recovery password verification string (step 708). Afterward, the data processing system makes a determination as to whether a match exists between the retrieved recovery password verification string and the generated recovery password verification string (step 710).

If the data processing system determines that a match does exist between the retrieved recovery password verification string and the generated recovery password verification string, yes output of step 710, then the data processing system validates the received recovery password (step 712). Further, the data processing system, using a second cryptographic one-way hash function that is derived from a first cryptographic one-way hash function, generates a user password encryption key based on the received recovery password (step 714). The data processing system also retrieves an encrypted user password from the storage of the software token (step 716).

The data processing system, using a decryption function, decrypts the encrypted user password based on the generated user password encryption key to form a decrypted user password (step 718). The data processing system, using the same second cryptographic one-way hash function derived from the first cryptographic one-way hash function, also generates a user password encryption key-encryption key based on the decrypted user password (step 720).

The data processing system receives the new recovery password (step 722). The data processing system, using the same second cryptographic one-way hash function derived from the first cryptographic one-way hash function, generates a new user password encryption key based on the new recovery password (step 724). The data processing system, using an encryption function, encrypts the decrypted user password based on the generated new user password encryption key to form a new encrypted user password (step 726). Afterward, the data processing system replaces the encrypted user password on the storage of the software token with the new encrypted user password (step 728).

Further, the data processing system, using the same encryption function, encrypts the new user password encryption key based on the generated user password encryption key-encryption key to form a new encrypted user password encrypting key (step 730). In addition, the data processing system replaces an existing encrypted user password encrypting key on the storage of the software token with the new encrypted user password encrypting key (step 732). Furthermore, the data processing system, using the same first cryptographic one-way hash function, generates a new recovery password verification string based on the new recovery password (step 734). Then, the data processing system replaces the retrieved recovery password verification string with the new recovery password verification string on the storage of the software token (step 736). Thereafter, the process terminates.

Returning again to step 710, if the data processing system determines that a match does not exist between the retrieved recovery password verification string and the generated recovery password verification string, no output of step 710, then the data processing system makes a determination as to whether a defined number of recovery password authentication attempts has been exceeded (step 738). If the data processing system determines that the defined number of recovery password authentication attempts has not been exceeded, no output of step 738, then the data processing system receives another recovery password to change the recovery password on the storage of the software token (step 740). Thereafter, the process returns to step 706 where the data processing system generates another recovery password verification string based on the newly received recovery password.

If the data processing system determines that the defined number of recovery password authentication attempts has been exceeded, yes output of step 738, then the data processing system sets the retrieved recovery password verification string to all zeros making the valid recovery password unrecoverable (step 742). The data processing system stores the retrieved recovery password verification string set to all zeros in the storage of the software token (step 744). The data processing system also sets a flag indicating that the valid recovery password is unrecoverable on the storage of the software token (step 746). Furthermore, the data processing system prevents changing of the valid recovery password to the new recovery password on the storage of the software token (step 748). Thereafter, the process terminates.

Thus, illustrative embodiments of the present invention provide a method, data processing system, and computer program product for secure password lock and recovery. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for secure password lock and recovery, the method comprising:
   responsive to a data processing system determining that a defined number of user password authentication attempts has been exceeded for accessing a secure resource protected by the data processing system, locking, by the data processing system, a valid user password on a storage of a software token to form a locked user password by setting a retrieved user password verification string to a preestablished sequence of values;
   receiving, by the data processing system, a recovery password to unlock the locked user password to form a received recovery password;
   determining, by the data processing system, whether a match exists between a retrieved recovery password verification string corresponding to a valid recovery password from the storage of the software token and a generated recovery password verification string corresponding to the received recovery password;
   responsive to the data processing system determining that a match does exist between the retrieved recovery password verification string and the generated recovery password verification string, validating, by the data processing system, the received recovery password;
   unlocking, by the data processing system, the locked user password to form an unlocked user password; and
   displaying, by the data processing system, the unlocked user password.

2. The method of claim 1 further comprising:
   receiving, by the data processing system, a user password to access the secure resource protected by the data processing system to form a received user password;
   determining, by the data processing system, whether a match exists between the retrieved user password verification string corresponding to the valid user password from the storage of the software token and a generated user password verification string corresponding to the received user password;
   responsive to the data processing system determining that a match does not exist between the retrieved user password verification string and the generated user password verification string, determining, by the data processing system, whether the defined number of user password authentication attempts has been exceeded;
   responsive to the data processing system determining that the defined number of user password authentication attempts has been exceeded, setting, by the data processing system, the retrieved user password verification string to the preestablished sequence of values locking the valid user password on the storage of the software token;
   storing, by the data processing system, the retrieved user password verification string set to the preestablished sequence of values in the storage of the software token;
   setting, by the data processing system, a flag indicating that the valid user password is locked on the storage of the software token; and
   denying, by the data processing system, access to the secure resource.

3. The method of claim 2 further comprising:
   retrieving, by the data processing system, a first user password verification string corresponding to the valid user password from the storage of the software token contained in the data processing system;

generating, by the data processing system, using a first cryptographic one-way hash function, a second user password verification string based on the received user password; and comparing, by the data processing system, the retrieved first user password verification string with the generated second user password verification string.

4. The method of claim 1 further comprising:

generating, by the data processing system, using a second cryptographic one-way hash function that is derived from a first cryptographic one-way hash function, a user password encryption key based on the received recovery password;

retrieving, by the data processing system, an encrypted user password corresponding to the locked user password from the storage of the software token;

decrypting, by the data processing system, using a decryption function, the encrypted user password based on the generated user password encryption key to form a decrypted user password;

generating, by the data processing system, using the first cryptographic one-way hash function, a user password verification string based on the decrypted user password; and replacing, by the data processing system, an existing user password verification string that was set to the preestablished sequence of values when the locked user password was locked on the storage of the software token with the generated user password verification string.

5. The method of claim 1 further comprising:

responsive to the data processing system determining that a match does not exist between the retrieved recovery password verification string and the generated recovery password verification string, determining, by the data processing system, whether a defined number of recovery password authentication attempts has been exceeded;

responsive to the data processing system determining that the defined number of recovery password authentication attempts has been exceeded, setting, by the data processing system, the retrieved recovery password verification string to the preestablished sequence of values making the recovery password unrecoverable;

storing, by the data processing system, the retrieved recovery password verification string set to the preestablished sequence of values in the storage of the software token;

setting, by the data processing system, a flag indicating that the valid recovery password is unrecoverable; and preventing, by the data processing system, unlocking of the locked user password on the storage of the software token.

6. The method of claim 2 further comprising:

receiving, by the data processing system, a user password to add data to the storage of the software token;

determining, by the data processing system, whether a match exists between a retrieved user password verification string corresponding to a valid user password and a generated user password verification string corresponding to the received user password;

responsive to the data processing system determining that a match does exist between the retrieved user password verification string and the generated user password verification string, validating, by the data processing system, the received user password;

receiving, by the data processing system, the data to be added to the storage of the software token;

generating, by the data processing system, a token data key derived from the received user password;

encrypting, by the data processing system, the data to be added to the storage of the software token using the generated token data key derived from the received user password; and adding, by the data processing system, the encrypted data to the storage of the software token.

7. The method of claim 2 further comprising:

receiving, by the data processing system, a user password to change the user password to a new user password on the storage of the software token;

determining, by the data processing system, whether a match exists between the retrieved user password verification string corresponding to a valid user password and the generated user password verification string corresponding to the received user password;

responsive to the data processing system determining that a match does exist between the retrieved user password verification string and the generated user password verification string, validating, by the data processing system, the received user password;

generating, by the data processing system, using a second cryptographic one-way hash function that is derived from a first cryptographic one-way hash function, a user password encryption key-encryption key based on the received user password;

retrieving, by the data processing system, an encrypted user password encrypting key from the storage of the software token; and decrypting, by the data processing system, using a decryption function, the encrypted user password encrypting key based on the generated user password encryption key-encryption key to form a decrypted user password encrypting key.

8. The method of claim 7 further comprising:

receiving, by the data processing system, the new user password;

encrypting, by the data processing system, using an encryption function, the new user password based on the decrypted user password encrypting key to form a new encrypted user password;

replacing, by the data processing system, an existing encrypted user password on the storage of the software token with the new encrypted user password;

generating, by the data processing system, using the second cryptographic one-way hash function derived from the first cryptographic one-way hash function, a new user password encryption key-encryption key based on the new user password;

encrypting, by the data processing system, using the encryption function, the decrypted user password encryption key based on the new user password encryption key-encryption key to form a new encrypted user password encrypting key;

replacing, by the data processing system, the encrypted user password encrypting key retrieved from the storage of the software token with the new encrypted user password encrypting key;

generating, by the data processing system, using the first cryptographic one-way hash function, a new user password verification string based on the new user password; and replacing, by the data processing system, an existing user password verification string on the storage of the software token with the new user password verification string.

9. The method of claim 1 further comprising:
receiving, by the data processing system, a recovery password to change the recovery password to a new recovery password on the storage of the software token;
determining, by the data processing system, whether a match exists between a retrieved recovery password verification string corresponding to a valid recovery password and a generated recovery password verification string corresponding to the received recovery password;
responsive to the data processing system determining that a match does exist between the retrieved recovery password verification string and the generated recovery password verification string, validating, by the data processing system, the received recovery password;
generating, by the data processing system, using a second cryptographic one-way hash function that is derived from a first cryptographic one-way hash function, a user password encryption key based on the received recovery password;
retrieving, by the data processing system, an encrypted user password encrypting key from the storage of the software token;
decrypting, by the data processing system, using a decryption function, the encrypted user password based on the generated user password encryption key to form a decrypted user password; and
generating, by the data processing system, using the second cryptographic one-way hash function derived from the first cryptographic one-way hash function, a user password encryption key-encryption key based on the decrypted user password.

10. The method of claim 9 further comprising:
receiving, by the data processing system, the new recovery password;
generating, by the data processing system, using the second cryptographic one-way hash function derived from the first cryptographic one-way hash function, a new user password encryption key based on the new recovery password;
encrypting, by the data processing system, using an encryption function, the decrypted user password based on the generated new user password encryption key to form a new encrypted user password;
replacing, by the data processing system, the encrypted user password on the storage of the software token with the new encrypted user password;
encrypting, by the data processing system, using the encryption function, the new user password encryption key based on the generated user password encryption key-encryption key to form a new encrypted user password encrypting key;
replacing, by the data processing system, an existing encrypted user password encrypting key on the storage of the software token with the new encrypted user password encrypting key;
generating, by the data processing system, using the first cryptographic one-way hash function, a new recovery password verification string based on the new recovery password; and replacing, by the data processing system, the retrieved recovery password verification string with the new recovery password verification string on the storage of the software token.

11. A data processing system for secure password lock and recovery, the data processing system comprising:
a bus system;
a storage device connected to the bus system, wherein the storage device stores program instructions; and
a processor connected to the bus system, wherein the processor executes the program instructions to:
lock a valid user password on a storage of a software token to form a locked user password by setting a retrieved user password verification string to a pre-established sequence of values in response to determining that a defined number of user password authentication attempts has been exceeded for accessing a secure resource protected by the data processing system;
receive a recovery password to unlock the locked user password to form a received recovery password;
determine whether a match exists between a retrieved recovery password verification string corresponding to a valid recovery password from the storage of the software token and a generated recovery password verification string corresponding to the received recovery password;
validate the received recovery password in response to determining that a match does exist between the retrieved recovery password verification string and the generated recovery password verification string;
unlock the locked user password to form an unlocked user password; and
display the unlocked user password.

12. The data processing system of claim 11, wherein the processor further executes the program instructions to:
receive a user password to access the secure resource protected by the data processing system to form a received user password;
determine whether a match exists between the retrieved user password verification string corresponding to the valid user password from the storage of the software token and a generated user password verification string corresponding to the received user password;
determine whether the defined number of user password authentication attempts has been exceeded in response to determining that a match does not exist between the retrieved user password verification string and the generated user password verification string;
set the retrieved user password verification string to the preestablished sequence of values locking the valid user password on the storage of the software token in response to determining that the defined number of user password authentication attempts has been exceeded;
store the retrieved user password verification string set to the preestablished sequence of values in the storage of the software token;
set a flag indicating that the valid user password is locked on the storage of the software token; and
deny access to the secure resource.

13. A computer program product for secure password lock and recovery, the computer program product comprising a computer readable storage medium having program instructions embodied therewith, the program instructions executable by a data processing system to cause the data processing system to perform a method comprising:

responsive to a data processing system determining that a defined number of user password authentication attempts has been exceeded for accessing a secure resource protected by the data processing system, locking, by the data processing system, a valid user password on a storage of a software token to form a locked user password by setting a retrieved user password verification string to a preestablished sequence of values;

receiving, by the data processing system, a recovery password to unlock the locked user password to form a received recovery password;

determining, by the data processing system, whether a match exists between a retrieved recovery password verification string corresponding to a valid recovery password from the storage of the software token and a generated recovery password verification string corresponding to the received recovery password;

responsive to the data processing system determining that a match does exist between the retrieved recovery password verification string and the generated recovery password verification string, validating, by the data processing system, the received recovery password;

unlocking, by the data processing system, the locked user password to form an unlocked user password; and displaying, by the data processing system, the unlocked user password.

14. The computer program product of claim 13 further comprising:

receiving, by the data processing system, a user password to access the secure resource protected by the data processing system to form a received user password;

determining, by the data processing system, whether a match exists between the retrieved user password verification string corresponding to the valid user password from the storage of the software token and a generated user password verification string corresponding to the received user password;

responsive to the data processing system determining that a match does not exist between the retrieved user password verification string and the generated user password verification string, determining, by the data processing system, whether the defined number of user password authentication attempts has been exceeded;

responsive to the data processing system determining that the defined number of user password authentication attempts has been exceeded, setting, by the data processing system, the retrieved user password verification string to the preestablished sequence of values locking the valid user password on the storage of the software token;

storing, by the data processing system, the retrieved user password verification string set to the preestablished sequence of values in the storage of the software token;

setting, by the data processing system, a flag indicating that the valid user password is locked on the storage of the software token; and denying, by the data processing system, access to the secure resource.

15. The computer program product of claim 14 further comprising:

retrieving, by the data processing system, a first user password verification string corresponding to the valid user password from the storage of the software token contained in the data processing system;

generating, by the data processing system, using a first cryptographic one-way hash function, a second user password verification string based on the received user password; and comparing, by the data processing system, the retrieved first user password verification string with the generated second user password verification string.

16. The computer program product of claim 13 further comprising:

generating, by the data processing system, using a second cryptographic one-way hash function that is derived from a first cryptographic one-way hash function, a user password encryption key based on the received recovery password;

retrieving, by the data processing system, an encrypted user password corresponding to the locked user password from the storage of the software token;

decrypting, by the data processing system, using a decryption function, the encrypted user password based on the generated user password encryption key to form a decrypted user password;

generating, by the data processing system, using the first cryptographic one-way hash function, a user password verification string based on the decrypted user password; and replacing, by the data processing system, an existing user password verification string that was set to the preestablished sequence of values when the locked user password was locked on the storage of the software token with the generated user password verification string.

17. The computer program product of claim 13 further comprising:

responsive to the data processing system determining that a match does not exist between the retrieved recovery password verification string and the generated recovery password verification string, determining, by the data processing system, whether a defined number of recovery password authentication attempts has been exceeded;

responsive to the data processing system determining that the defined number of recovery password authentication attempts has been exceeded, setting, by the data processing system, the retrieved recovery password verification string to the preestablished sequence of values making the recovery password unrecoverable;

storing, by the data processing system, the retrieved recovery password verification string set to the preestablished sequence of values in the storage of the software token;

setting, by the data processing system, a flag indicating that the valid recovery password is unrecoverable; and preventing, by the data processing system, unlocking of the locked user password on the storage of the software token.

18. The computer program product of claim 14 further comprising:

receiving, by the data processing system, a user password to add data to the storage of the software token;

determining, by the data processing system, whether a match exists between a retrieved user password verification string corresponding to a valid user password and a generated user password verification string corresponding to the received user password;

responsive to the data processing system determining that a match does exist between the retrieved user password verification string and the generated user password verification string, validating, by the data processing system, the received user password;

receiving, by the data processing system, the data to be added to the storage of the software token;

generating, by the data processing system, a token data key derived from the received user password;

encrypting, by the data processing system, the data to be added to the storage of the software token using the generated token data key derived from the received user password; and adding, by the data processing system, the encrypted data to the storage of the software token.

* * * * *